US010440558B1

(12) United States Patent
De Figueiredo Junior et al.

(10) Patent No.: US 10,440,558 B1
(45) Date of Patent: Oct. 8, 2019

(54) EMBEDDED SIM PROFILE DOWNLOAD AND MANAGEMENT SYSTEM

(71) Applicant: Giesecke+Devrient Mobile Security America, Inc., Dulles, VA (US)

(72) Inventors: Ivan De Figueiredo Junior, Roswell, GA (US); Thomas Larsson, Älvsjö (SE)

(73) Assignee: GIESECKE+DEVRIENT MOBILE SECURITY AMERICA, INC., Dulles, VA (US)

( * ) Notice: Subject to any disclaimer, the term of this patent is extended or adjusted under 35 U.S.C. 154(b) by 0 days.

(21) Appl. No.: 15/956,184

(22) Filed: Apr. 18, 2018

(51) Int. Cl.
| *H04M 1/00* | (2006.01) |
| *H04W 8/18* | (2009.01) |
| *H04W 8/26* | (2009.01) |
| *H04L 12/24* | (2006.01) |
| *H04W 88/06* | (2009.01) |
| *H04W 4/50* | (2018.01) |

(52) U.S. Cl.
CPC ............ *H04W 8/183* (2013.01); *H04L 41/08* (2013.01); *H04W 8/265* (2013.01); *H04W 88/06* (2013.01); *H04W 4/50* (2018.02)

(58) Field of Classification Search
USPC .............................. 455/557, 406, 461, 432.3
See application file for complete search history.

(56) References Cited

U.S. PATENT DOCUMENTS

| 9,516,487 | B2* | 12/2016 | Powell ................... H04W 4/24 |
| 9,860,736 | B1 | 1/2018 | Bruner et al. |
| 9,992,607 | B2 | 6/2018 | Bruner et al. |
| 2015/0073996 | A1* | 3/2015 | Makhotin ............. G06Q 20/02 705/71 |
| 2015/0140960 | A1* | 5/2015 | Powell ................... H04W 4/24 455/406 |
| 2017/0033823 | A1* | 2/2017 | Smith ..................... H04W 8/18 |
| 2017/0180349 | A1* | 6/2017 | Park ...................... H04W 12/06 |
| 2018/0270363 | A1* | 9/2018 | Guday ............. H04M 15/8083 |

* cited by examiner

*Primary Examiner* — David Q Nguyen
(74) *Attorney, Agent, or Firm* — Drinker Biddle & Reath LLP

(57) ABSTRACT

A profile management engine receives, from a mobile device management (MDM) server configured to manage one or more mobile devices, an activation request to activate a subscription for a mobile device of the plurality of mobile devices. The profile management engine generates a download request for preparing a download of an electronic subscriber profile to the mobile device, transmits the download request to a subscription management system of a network operator, and subsequently receives a download response from the subscription management system. The download response includes an identifier that identifies an electronic subscriber profile generated for the mobile device. The profile management engine generates an activation response including information for downloading the electronic subscriber profile generated for the mobile device, and transmits the activation response to the MDM server to enable the MDM server to trigger download of the electronic subscriber profile from the subscription management system to the mobile device.

20 Claims, 8 Drawing Sheets

US 10,440,558 B1

EMBEDDED SIM PROFILE DOWNLOAD AND MANAGEMENT SYSTEM

FIELD OF THE DISCLOSURE

The present disclosure relates generally to mobile devices, more particularly, to managing network subscriptions of mobile devices.

BACKGROUND

Businesses or enterprises often provide mobile computing devices to employees of the businesses or enterprises, or persons otherwise associated with businesses or enterprises. Such mobile computing devices are typically managed and monitored by mobile device management (MDM) systems employed by a business or an enterprise. Recently, mobile devices configured to employ electronic subscriber profiles for communicating on mobile networks have emerged. Such mobile devices are typically equipped with electronic/embedded secure element devices, such as electronic/embedded universal integrated circuit cards (eUICCs), configured to store one or more electronic subscriber profiles such as electronic subscriber identification module (eSIM) profiles that may allow mobile devices to connect to one or more mobile networks. A subscriber profile (e.g., eSIM profile) may be generated by a mobile network operator (MNO) and may be downloaded to a mobile device after deployment of the mobile device. The subscriber profile may then be installed on a secure element of the mobile device and used for communication over a corresponding mobile network by the mobile device.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely summarizes some of the concepts of the disclosure as a prelude to the more detailed description provided thereafter.

In an embodiment, a method for activating a network operator subscription includes receiving, at a profile management engine from a mobile device management (MDM) server configured to manage one or more mobile devices, an activation request to activate a subscription for a mobile device of the plurality of mobile devices. The method also includes generating, at the profile management engine, a download request for preparing a download of an electronic subscriber profile to the mobile device, and transmitting, with the profile management engine, the download request to a subscription management system of a network operator. The method further includes receiving, at the profile management engine from the subscription management system, a download response, the download response including an identifier that identifies an electronic subscriber profile generated for the mobile device. The method further still includes generating, at the profile management engine, an activation response including information for downloading the electronic subscriber profile generated for the mobile device, and transmitting, from the profile management engine to the MDM server, the activation response to the MDM server to enable the MDM server to trigger download of the electronic subscriber profile from the subscription management system to the mobile device.

In another embodiment, a tangible, non-transitory computer readable medium, or media, storing machine readable instructions that, when executed by one or more processors, cause the one or more processors to: process an activation request to activate a subscription for a mobile device, the request received from a mobile device management (MDM) server configured to manage one or more mobile devices; generate a download request for preparing a download of an electronic subscriber profile to the mobile device; cause the download request to be transmitted to a subscription management system of a network operator; process a download response received from the subscription management system, the download response including an identifier that identifies an electronic subscriber profile generated for the mobile device; generate an activation response including information for downloading the electronic subscriber profile generated for the mobile device; and cause the activation response to be transmitted to the MDM sever to enable the MDM server to trigger download of the electronic subscriber profile from the subscription management system to the mobile device.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

Figure 1:
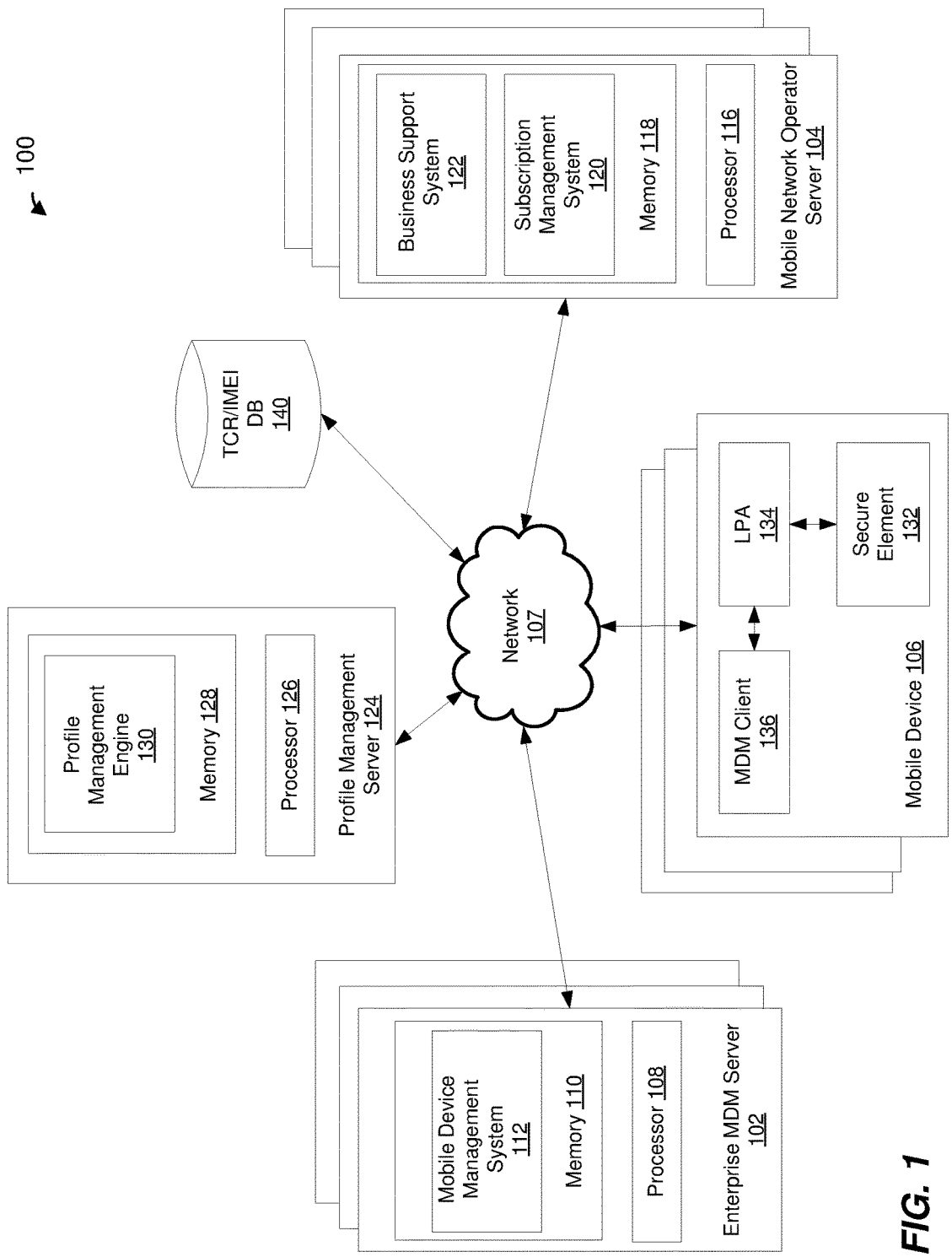
FIG. 1 is a block diagram of a system in which a profile management engine may be utilized for managing electronic subscriber profiles for mobile devices used across an enterprise, according to an embodiment.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Embodiments described herein generally relate to methods and apparatus for provisioning and managing mobile network subscriber profiles, such as electronic or embedded subscriber identification module (eSIM) profiles, to mobile devices managed by businesses or enterprises, such as mobile devices utilized by employees of the businesses or enterprises or other persons associated with the businesses or enterprises. In various embodiments described herein, a profile management engine may provide a link between (i) enterprise mobile device management systems (MDM) employed by businesses or enterprises to manage mobile devices utilized across the businesses or enterprises and (ii) subscription management systems (e.g., eSIM management systems) employed by network operators, such as a mobile network operators (MNO), mobile virtual network operators (MVNO) or other suitable network operators, for provisioning subscriber profiles to the mobile devices. The profile management engine may handle subscription activation requests generated by enterprise MDM systems on behalf of mobile devices managed by the MDM systems. For example, the profile management engine may trigger subscriber profile management systems of network operators to provision and activate appropriate subscriber profiles to be downloaded to the mobile devices managed by the MDM systems. In some embodiments, prior to triggering provisioning of subscriber profiles, the profile management engine may perform various validations and checks to ensure that only appropriate subscriber profiles are provided to the managed mobile devices. The profile management engine may also maintain inventories of subscriber profiles available for or utilized by mobile devices managed by MDM systems, and may update the inventories when subscriber profiles are deleted from mobile devices, new subscriber profile are activated and downloaded to mobile device, etc. These and other techniques described herein allow businesses and enterprises to effectively and efficiently manage mobile network subscriptions that the businesses and enterprises may provide to mobile devices equipped for electronic subscriber profile provisioning, in various embodiments.

FIG. 1 is a block diagram of a system 100 in which techniques for subscriber profile management techniques described herein may be utilized, according to an embodiment. System 100 may include one or more enterprise servers 102, one or more network operator servers (e.g., MNO servers) 104, and one or more mobile devices 106, which may be communicatively coupled via a communication network 107. Communication network 107 may be a wide area network (WAN) such as the Internet, a local area network (LAN), or any other suitable type of communication network. In some embodiments, communication network 107 may be a single communication network or may be made up of multiple different communication networks.

In an exemplary embodiment, enterprise servers 102 implement a mobile device management (MDM) system for managing mobile devices utilized across business or enterprises and, accordingly, enterprise servers 102 are sometimes referred to herein as enterprise MDM servers or simply MDM servers. An enterprise server 102 may include a processor 108 and a computer-readable memory 110 that stores a mobile device management (MDM) system 112 in the form of computer-readable instructions, for example, that may be executable by the processor 108. Computer readable memory 110 may include volatile memory to store computer instructions and data on which the computer instructions operate at runtime (e.g., Random Access Memory or RAM) and, in an embodiment, persistent memory such as a hard disk, for example. MDM system 112 may be employed by a business or an enterprise to monitor and manage mobile devices 106 that may be utilized, for example, by employees of the business or enterprise or persons otherwise associated with the business or enterprise. MDM system 112 may also be implemented to manage mobile devices 106 such that mobile devices 106 conform with guidelines and/or policies of the enterprise or business. For example, MDM system 112 may limit the ability for an employee of the enterprise or business to download and/or install applications on mobile devices 106 that do not comport with guidelines and/or policies of the enterprise or business.

MNO servers 104 may be employed by one or more network service providers, including virtual providers, and be configured to provide mobile communication services to mobile devices 106 on one or more mobile (e.g., cellular) networks. For example, respective MNO servers 104 may be employed by respective network service providers, and may provide communication services on respective mobile networks operated by the respective network providers. An MNO server 104 may include a processor 116 and a computer-readable memory 118 that stores a subscription management system 120 and a business support system (BSS) 122 in the form of computer-readable instructions, for example, that may be executable by the processor 116. Computer readable memory 118 may include volatile memory to store computer instructions and data on which the computer instructions operate at runtime (e.g., Random Access Memory or RAM) and, in an embodiment, persistent memory such as a hard disk, for example. Subscription management system 120 may generate and manage subscriber profiles that are provided to mobile devices, such as mobile devices 114, to enable the mobile devices to obtain access to network operated by the MNO. In an exemplary embodiment, subscription management system 120 may conform to a subscription manager data preparation standard, the SM-DP+ standard specified by the GSM Association (GSMA), and subscription management system 120 is sometimes referred to herein as ""SM-DP+" for exemplary purposes. However, subscription management system 120 may generate and manage subscriber profiles in other suitable manners, in other embodiments. BSS 122 may provision, activate and maintain MNO subscriptions, in an embodiment. For example, BSS 122 may provision, activate, and maintain records of subscriber accounts, business or enterprise contracts established with the MNO, rules and/or policies established for subscribers of the MNO, etc.

Mobile devices 106 may include, for example, personal computers, laptop computers, notebook computers, tablet computers, cellular phones, smart phones, and other suitable devices that may be configured for communication over a mobile network. At least some mobile devices 106 may be configured or configurable to communicate over one or multiple mobile networks owned and/or operated by one or multiple MNOs. For example, a mobile device 106 may be equipped with an "embedded" or "electronic" smart element, such as an embedded universal circuit card (eUICC). Such mobile device 106 may receive (e.g., over the air) one or more subscriber profiles, such as embedded subscriber identity module (eSIM) profiles or simply eSIMs, from one or more MNOs, and may install the one or more subscriber profiles on the embedded smart element. A subscriber profile may generally include information used to identify mobile device 106 on a mobile network operated by an MNO and enable mobile device 106 to establish communication over the mobile network operated by the MNO. A subscriber profile may additionally include one or more applications (sometimes referred to herein as "applets") for executing local commands within the eUICC and/or for enabling the eUICC to communicate with (e.g., provide data to) components external to the eUICC, such as servers or external applications, for example.

Upon receiving one or more subscriber profiles from one or more MNOs and installing the one or more subscriber profiles on the secure element, mobile device 106 may enable a particular one of the subscriber profiles and may utilize the enabled subscriber profile for establishing communication over the corresponding mobile network. Although mobile device 106 may receive and install multiple subscriber profiles, such as, for example, respective subscriber profiles provided by different ones of multiple MNOs, mobile device 106 is configured to operate with only one of the multiple subscriber profiles enabled at any given time, in an embodiment. Subsequently, mobile device 106 may disable the subscriber profile and may instead enable another one of the one or more subscriber profiles to enable mobile device 106 to communicate over another mobile network. In some embodiments and scenarios, mobile device 106 may delete, replace, update, upgrade, etc., a subscriber profile that was previously received by mobile device 106 from an MNO.

A profile management server 124 may be communicatively coupled to one or more enterprise servers 102 and one or more MNO servers 104 via the network 107. Profile management server 124 may link MDMs 112 running on enterprise severs 102 with subscriber management systems 120 and/or BSSs 122 that run on MNO servers 104. Profile management engine 130 may additionally be communicatively coupled to a device database 140, which may include any suitable combination of one or more of a terminal capability repository (TCR), an international mobile equipment identity (IMEI) database, a type allocation code (TAC) database, another suitable device database, etc. Profile management server 124 may include a processor 126 and a computer-readable memory 128 that stores a profile download and management engine 130 in the form of computer-readable instructions, for example, that may be executable by the processor 126. Computer readable memory 128 may include volatile memory to store computer instructions and data on which the computer instructions operate at runtime (e.g., Random Access Memory or RAM) and, in an embodiment, persistent memory such as a hard disk, for example. Profile management engine 130 may provide a link between enterprise servers 102 and MNO servers 104 and may allow MDM systems 112 of enterprise servers 102 to trigger download of subscriber profiles to mobile devices 114 from MNO servers 104.

Mobile device 106 is illustrated in FIG. 1 as including a secure element 132, a local profile assistant (LPA) 134, and an MDM client 136. Secure element 132 may be configured to operate with one or more subscriber profiles, such as electronic subscriber identity module profiles (eSIM profiles or simply eSIMs), that allow secure element 132 to connect to a mobile network and to enable mobile device 106 to communicate over the mobile network. In various embodiments, secure element 132 may be an embedded universal circuit card (eUICC), or may be a removable UICC configured for electronic subscriber profile operation. LPA 134 may be communicatively coupled to secure element 132 and may be configured to control download and management of subscriber profiles used by secure element 132. In an exemplary embodiment, LPA 134 may be configured to establish a secure channel with subscription management system 120, and to initiate download of a subscriber profile, generated by the subscription management system 120, to secure element 132 over the secure channel. LPA 134 may then cause the downloaded subscriber profile to be installed and enabled on secure element 132.

With continued reference to FIG. 1, MDM client 136 of mobile device 106 is configured to communicate with one or more MDM servers 102, for example to exchange control and management messages with one or more MDM servers 102. In operation, MDM client 136 may generate and transmit an enrollment request to MDM server 102, requesting to enroll mobile device 106 in MDM system 112 and to activate a mobile network subscription for device 106. The enrollment request may identify business or enterprise employing MDM system 112 and mobile device 106 on behalf of which the enrollment request is sent. In response to receiving the enrollment request from MDM client 136, MDM server 102 may generate and transmit an activation request to profile management engine 130. Profile management engine 130 may, in turn, generate and transmit a download request to subscription management system 120 to initiate preparation of a subscriber profile for mobile device 106. Profile management engine 130 may additionally generate and transmit a subscription activation request to BSS 122 to activate an MNO subscription for mobile device 106. In some embodiments, prior to requesting generation of a subscriber profile and/or activation of a subscription, profile management engine 130 may perform one or more validations or checks, to select an appropriate MNO for mobile device 106 and to ensure that only appropriate subscription profiles are generated and provided to mobile devices 106. For example, profile management engine 130 may perform one or more actions to: (i) validate MNO contract of the business or enterprise, (ii) check enterprise rules to select appropriate MNO and subscription for user of mobile device 106, (iii) check version and capabilities of secure element 132 of mobile device 106, and (iv) check device eligibility based on information stored in device database 140, etc., in various embodiments. In such a manner, profile management engine 130 may enable MDM systems 112 to effectively and efficiently obtain and manage provision of subscriber profiles to mobile devices 106 managed by MDM systems 112.

With continued reference to FIG. 1, in response to requesting subscription management system 120 to generate a subscriber profile for mobile device 106, profile management engine 130 may receive from subscription management system 120 information identifying a generated subscriber profile for mobile device 106. Profile management engine 130 may relay the information identifying the generated subscriber profile to MDM server 102. Additionally, profile management engine 130 may generate an activation code (e.g., a token) for secure download of the generated profile from subscription management system 120, and may provide the activation code to MDM server 102. MDM server 102 may, in turn, provide the information identifying the generated subscriber profile and, in some cases, the activation code for secure download of the generated profile, to MDM client 136 of mobile device 106. LPA 134 of mobile device 106 may utilize the information received from MDM server 102 to download the generated subscriber profile from subscription management system 120 to mobile device 106 and to install the subscriber profile on secure element 132.

Figure 2:
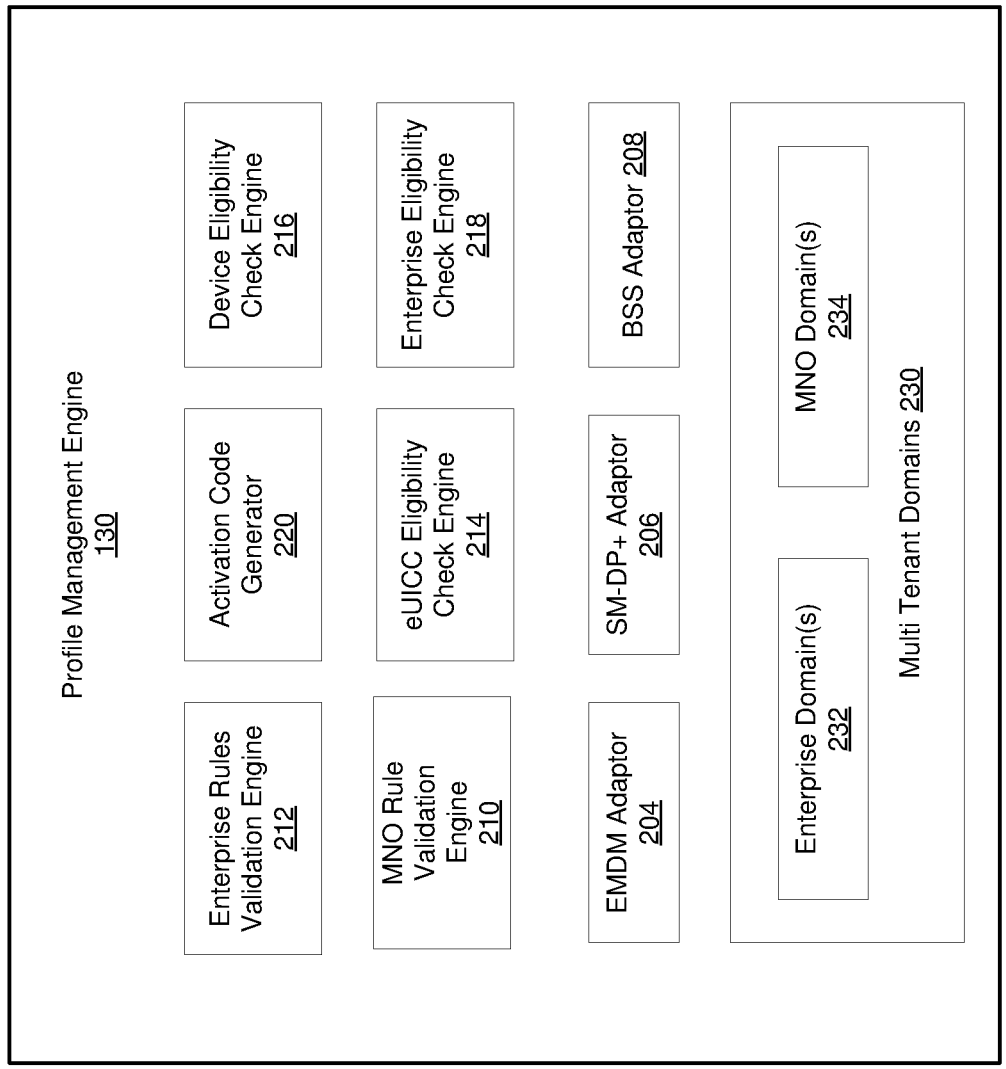
FIG. 2 is a block diagram of the profile management engine used with the system of FIG. 1, according to an embodiment.

FIG. 2 is a block diagram of profile management engine 130 of FIG. 1, according to an embodiment. In the illustrated embodiment of FIG. 2, profile management engine 130 includes one or more Enterprise MDM (EMDM) adaptors 204 for communicating with one or more MDM servers 102, one or more subscriber management system adaptors (e.g., SM-DP+ adaptors) 206 for communicating with one or more subscriber management systems (e.g., SM-DP+) 120 and one or more BSS adaptors 208 for communicating with one or more business support systems 122. Profile management engine 130 also includes an MMO rule validation engine 210, an enterprise rule validation engine 212, a secure element (e.g., eUICC) eligibility check engine 214, a device eligibility check engine 216, an enterprise eligibility check engine 218 and an activation code generator 220. In some embodiments, profile management engine 130 may omit one or more of the engines 210-220. For example, profile management engine 130 may omit one or both of device eligibility check engine 216 and enterprise eligibility check engine 218, in some embodiments.

In an embodiment, profile management engine 130 may receive a subscription activation request on behalf of a mobile device 106 from an MDM server 102 via EMDM adaptor 206. Upon receiving the subscription activation request from an MDM server 102, profile management engine 130 may employ one or more of MNO rule validation engine 210, enterprise rule validation engine 212, secure element (e.g., eUICC) eligibility check engine 214, device eligibility check engine 216, and enterprise eligibility check engine 218 to perform various checks and validations, for example to ensure that the profile management engine 130 triggers generation of an appropriate subscriber profile for mobile device 106 and/or activation of an appropriate subscription for mobile device 106. Profile management engine 130 may then generate and transmit a download request message to SM-DP+ 120, via SM-DP+ adaptor 208, to trigger generation of a subscriber profile for mobile device 106 by SM-DP+ 120. Profile management engine 130 may also generate and transmit a subscription activation message to BSS 122, via BSS adaptor 210, to activate a subscription for mobile device 106 in BSS 122. In response to transmitting download request message and subscription activation message to, respectively, SM-DP+ 120 and BSS 122, profile management engine 130 may receive response messages from SM-DP+ 120 and/or BSS 122, the response messages including information (e.g., identification information) of, respectively, a subscriber profile generated by SM-DP+ 120 and a subscription activated by BSS 122.

Upon receiving the information from SM-DP+ 120 and BSS 122, profile management engine 130 may employ activation code generator 214 to generate an activation code for secure download of subscriber profile generated by SM-DP+ 120 to mobile device 106. Profile management engine 130 may generate a subscription activation response message that may include information identifying a generated subscriber profile and the activation code for secure download of the subscriber profile. The subscription activation response message may additionally include information needed for download of subscriber profile generated by SM-DP+ 120. Profile management engine 130 may transmit the subscription activation response message via EMDM adaptor 206 to MDM server 102 to enable MDM server 102 to trigger download of the subscription profile to mobile device 106.

In some embodiments, profile management engine 130 may be configured for multi-tenant operation with multiple MDM servers 102 (e.g., MDM servers 102 operated by respective different businesses or enterprises) and/or with multiple MNO servers 104 (e.g., MNO servers 104 operated by respective different mobile network operators). In an embodiment, profile management engine 130 includes or implements multiple tenant domains 230, including one or more enterprise domains 232 and/or one or more MNO domains 234. Respective one or more enterprise domains 232 and/or one or more MNO domains 234 may be independently operated to support respective enterprises and/or respective MNOs. For example, one or more enterprise domains 232 and/or one or more MNO domains 234 may segregate applications, databases, other data storage, etc., utilized for respective enterprises and/or respective MNOs.

Figure 3:
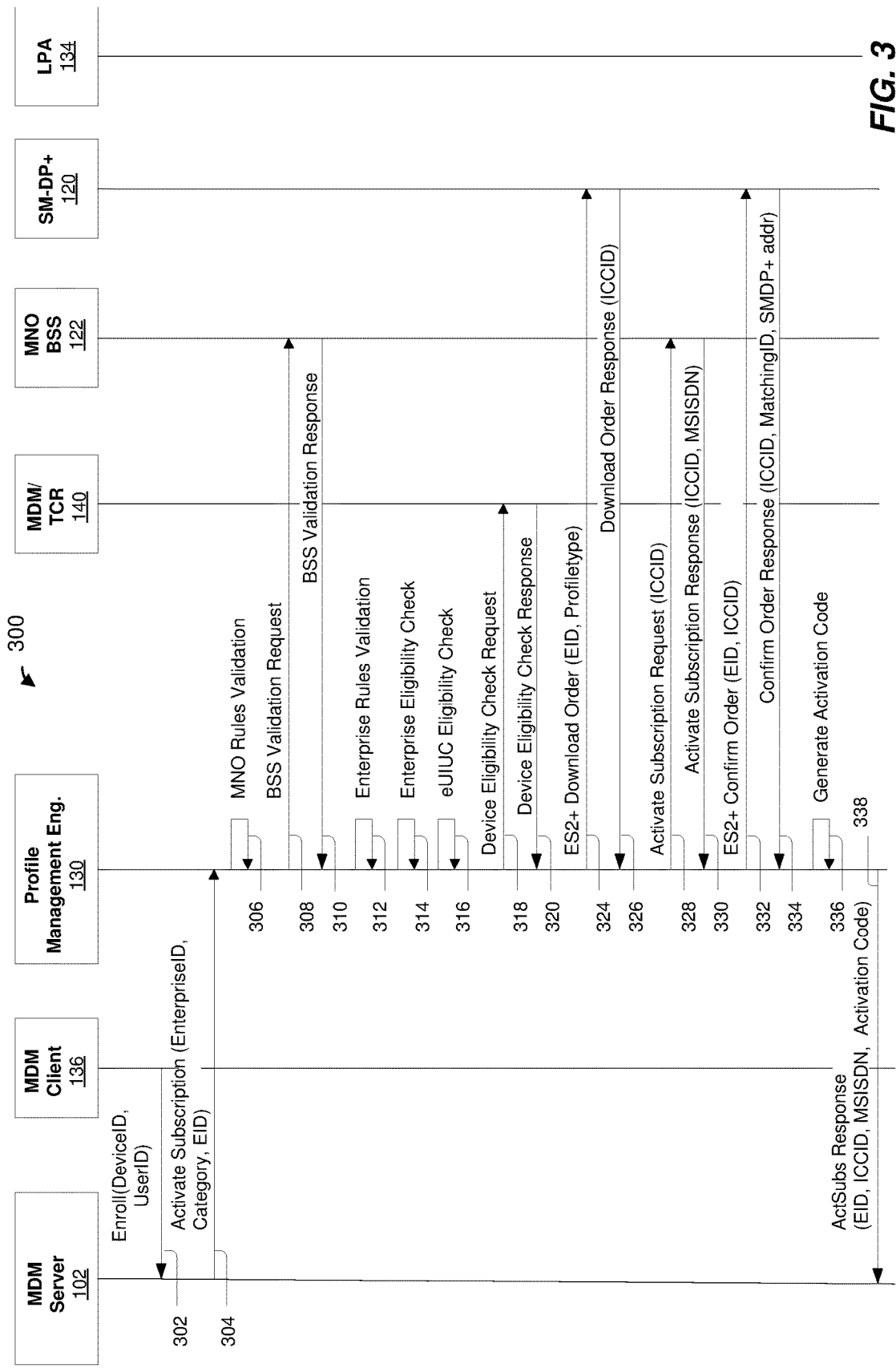
FIG. 3 is a diagram illustrating an enrollment process that includes assigning subscription profile to mobile device, implemented by the profile management engine used with the system of FIG. 1, according to an embodiment.

FIG. 3 is a diagram illustrating an enrollment process 300 that includes assigning subscription profile to mobile device 106, according to an embodiment. Mobile device 106 initiates enrollment process 300 by transmitting an enroll message 302. For example, MDM client 136 of mobile device 106 may transmit enrollment message 302 to MDM server 102. In an embodiment, MDM client 136 transits enrollment message 302 automatically, for example at an initial power up of mobile device 106 and/or periodically during operation of mobile device 106. In another embodiment, a user of mobile device 106 causes transmission of enroll message 302 by MDM client 102. Enroll message 302 may include one or more of: (i) identification information that identifies particular mobile device 106, (ii) identification information that identifies a particular secure element 132 of mobile device 106, and (iii) identification information that identifies a particular user of mobile device 106. For example, enroll message 302 may include one or more of: (i) a device identifier (e.g., deviceID) associated with mobile device 106, (ii) a secure element identifier (e.g., EID) associated with secure element 132 of mobile device 106, and (iii) a user identifier (e.g., userID) associated with user of mobile device 106.

MDM server 102 may obtain device information based on deviceID included in enrollment message 302 from MDM client 136. For example, MDM server 102 may maintain or have access to one or more databases that store associations between deviceIDs of mobile devices 106 managed by MDM sever 102 and information corresponding to the mobile devices 106. MDM server 102 may access the one or more databases using deviceID included in enrollment message 302, and may obtain device information corresponding to mobile device 106 that transmitted enrollment message 302. For example, MDM server 102 may obtain an eUICC identifier (EID) associated with secure element 132 of mobile device 106, international mobile equipment identifier (IMEI) associated with mobile device 106, or other information associated with mobile device 106.

MDM server 102 may additionally or alternatively obtain information about user of the mobile device 106 based on the user ID included in enrollment message 302. For example, MDM server may maintain or have access to one or more databases that store associations between userIDs associated with users of mobile devices 106 managed by MDM sever 102 and user information corresponding users of mobile devices 106. MDM server may access the one or more databases using userID included in enrollment message 302, and may obtain information about user of mobile device 106 that transmitted enrollment message 302. For example, MDM server 102 may obtain rules or policies applicable to the user of the mobile device 106, a category (e.g., manager, staff, etc) to which user of the mobile device 106 belongs, etc.

Continuing with the process 300, MDM server 102 may transmit an activate subscription message 304 to profile management engine 130. Activate subscription message 304 may include an identifier (e.g., EnterpriseID) that identifies the enterprise that is employing MDM server 102 to active subscription for mobile device 106. Activate subscription message 304 may also include information about mobile device 106 and/or user of mobile device 106. For example, activate subscription message 304 may include indication of a category associated with user of mobile device 106 and an EID (e.g., eUICC ID) associated with secure element 132 of mobile device 106.

Profile management engine 130 may receive activate subscription message 304 and may perform one or more checks and/or validations based on information included in activate subscription message 304. For example, profile management engine 130 may perform an MNO rules validation 306 to validate contract and policies that may be maintained for the enterprise in BSSs 122. To this end, profile management engine 130 may transmit a BSS validation request 308 to each of one or more BSSs 122, and may receive BSS validation responses from the one or more BSSs 122. Profile management engine 130 may perform an enterprise rules validation 312 to validate category indicated in the activate subscription message 304, to select an appropriate MNO and/or an appropriate profile type for user of mobile device 106. As just an example, if activate subscription message 304 indicates that subscriber profile is being requested for a manager (i.e., category=manager), profile manager 130 may select a manger profile type that may correspond to a subscription with a higher data plan relative to data plans that may be available to non-manager employees, for example. In some embodiments, profile management engine 130 may generate an "on-the-fly" profile configuration based on the indicated category, for example defining a data plan to be provided to user of mobile device 106 based on the user's category.

Profile management engine 130 may perform an enterprise eligibility check 314 and/or eUICC eligibility check 316, in some embodiments. Enterprise eligibility check 314 may check whether user of mobile device 106 is eligible for obtaining a subscriber profile from enterprise MDM system 112. Enterprise eligibility check 314 may also detect potential fraud attempted by, or on behalf, of mobile device 106.

For example, enterprise eligibility check 314 may determine whether multiple subscription activations requests have been received on behalf of mobile device 106, or if a number of received activation requests exceeds a maximum allowed number of requests. eUICC eligibility check 316, on the other hand, may check whether secure element 132 of mobile device 106 is capable of supporting the requested subscriber profile. For example, eUICC eligibility check 316 may determine whether the version of the secure element 132 (e.g., eUICC) is capable of supporting the requested subscriber profile, whether the secure element 132 has enough computer memory to install and operate the requested subscriber profile, etc.

Additionally, or alternatively, profile management engine 130 may perform a device eligibility check. To this end, profile management engine 130 may generate and transmit a device eligibility check information request 318 to TCR 140. Device eligibility check information request 318 may include IMEI associated with mobile device 106. In response to transmitting device eligibility check information request 318, profile management engine may receive device eligibility check information response 320 from TCR 140. Device eligibility check information response 320 may include information obtained from TCR 140 based on IMEI associated with mobile device 106, such as device capabilities, device activation history (success/failure) for mobile device 106, whether mobile device 106 is blacklisted (e.g., due to being lost or stolen), etc. Profile management engine 130 may utilize such information to approve or to deny subscription activation request received for mobile device 106, in some embodiments.

Upon performing and successfully passing the one or more validations and checks 306-320, profile management engine 130 may generate and transmit a download order message 324 to SM-DP+ 120. Download order message 324 may conform to ES2+ message format defined in the GSM Association (GSMA) specification (e.g., GSMA RSP SGP.22 V2.2), for example. Download order message 324 may include the EID associated with secure element 132 and an indication of a profile type to be generated for secure element 132, in an embodiment. In response to transmitting download order message 324, profile management engine 130 may receive download order response message 326, which may include a subscriber profile identifier, such as integrated circuit card identifier (ICCID) associated with generated subscriber profile.

Profile management engine 130 may generate and transmit a subscription activation request 328, indicating subscriber profile identifier (e.g., ICCID), to BSS 122, and may receive a subscription activation response 330 from BSS 122. Subscription activation response may include the subscriber profile identifier (e.g., ICCID) and may also include a mobile station international subscriber directory number (MSISDN) associated with subscription activated for mobile device 106.

Profile management engine 130 may generate and transmit a confirm order message 332 to SM-DP+ 120. Confirm order message 332 may conform to ES2+ message format defined in the GSM Association (GSMA) specification (e.g., GSMA RSP SGP.22 V2.2), for example. Confirm order message 332 may include the EID associated with secure element 132 and the ICCID associated with the subscriber profile generated for secure element 132, in an embodiment. In response to transmitting confirm order message 332, profile management engine 130 may receive confirm order response message 334. Confirm order response message 334 may include the ICCID associated with the subscriber profile generated for secure element 132 and may also include the EID associated with secure element 132. Confirm order response message 334 may additionally include information for download of the generated subscriber profile, such as a matching ID and SM-DP+ address for retrieval of the generated subscriber profile.

Profile management engine 130 may additionally generate an activation code 336 for secure download of the generated subscriber profile. In an embodiment, profile management engine 130 may generate the activation code based on matching ID and SM-DP+ address received from SM-DP+ 120. Profile management engine 130 may then generate and transmit an activation response message 338 to MDM server 102. Activation response 338 may include the EID, ICCID, MSISDN, and the activation code generated for download of subscriber profile to mobile device 106.

Figure 4:
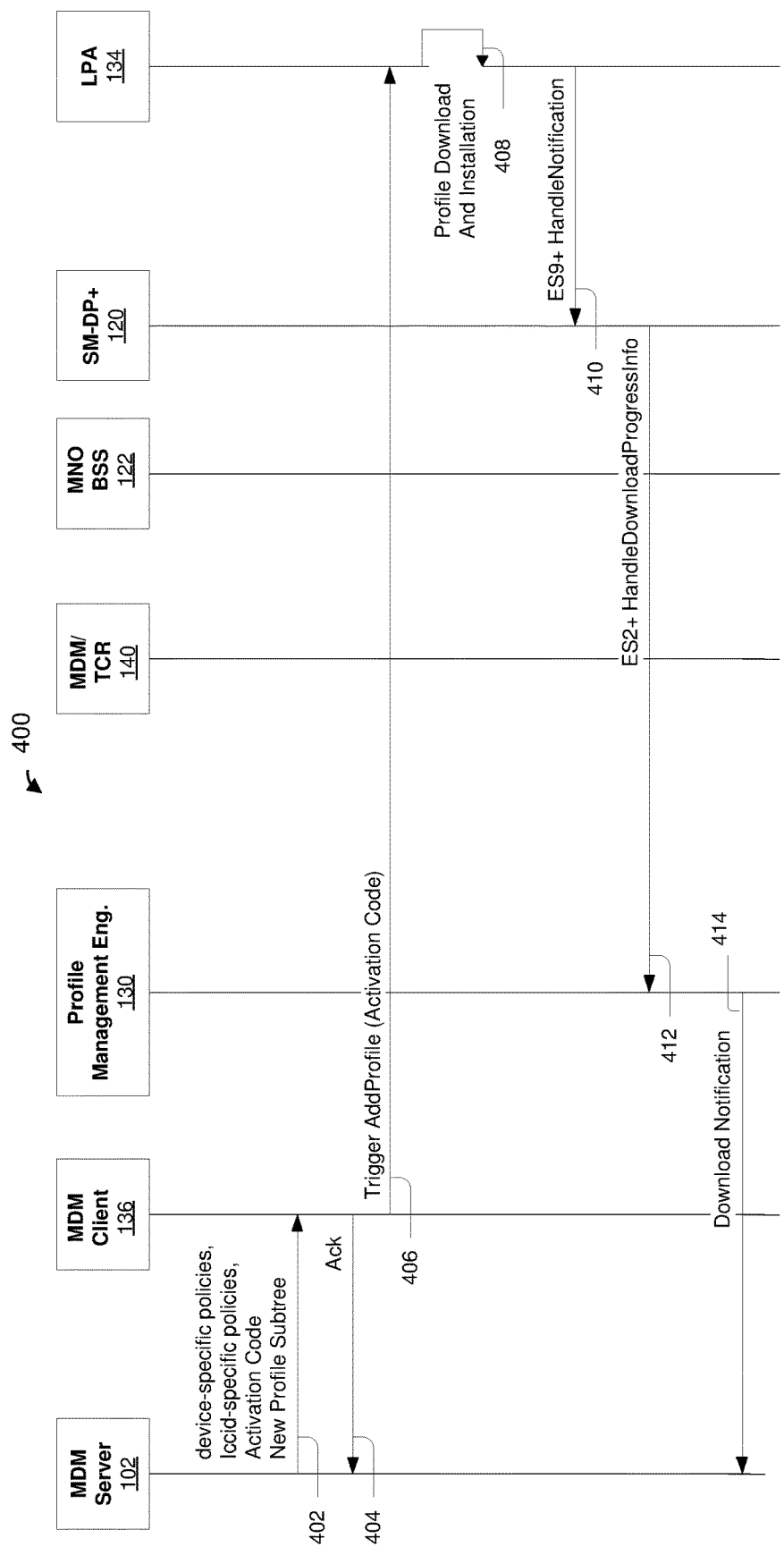
FIG. 4 is a diagram illustrating a subscriber profile download process to mobile device, triggered by the profile management engine used with the system of FIG. 1, according to an embodiment.

FIG. 4 is a diagram illustrating a subscriber profile download process 400 for downloading subscriber profile to mobile device 106, according to an embodiment. MDM server 102 may generate and transmit a download initiation message 402 to MDM client 136 of mobile device 106. Download initiation message 402 may include the activation code 338 generated by profile management engine 130 for download of the subscriber profile to device 106. MDM client 136 may respond with an acknowledgement (Ack) message 404, and may send a trigger message 406, including activation code 338, to LPA 134 that may utilize the activation code 338 to perform profile download and installation 408. Download and installation 408 may conform to "download and installation with activation code" procedure defined in GSMA specification, for example. LPA 134 may generate and transmit a handle notification message (e.g., ES9+ handle notification message) 410 to SM-DP+ 120, in an embodiment. SM-DP+ 120 may, in some embodiments, transmit a handle download progress information message (e.g., ES2+ handle download progress information message) 412 to profile management engine 130, for example informing profile management engine 130 that download and installation of the generated subscriber profile has been completed by mobile device 106. In some embodiments, profile management engine 130 may, in turn, generate and transmit a download notification message 414 to MDM server 102, in order to inform MDM system 112 of MDM server 102 that the generated subscriber profile has been installed on mobile device 106.

Figure 5:
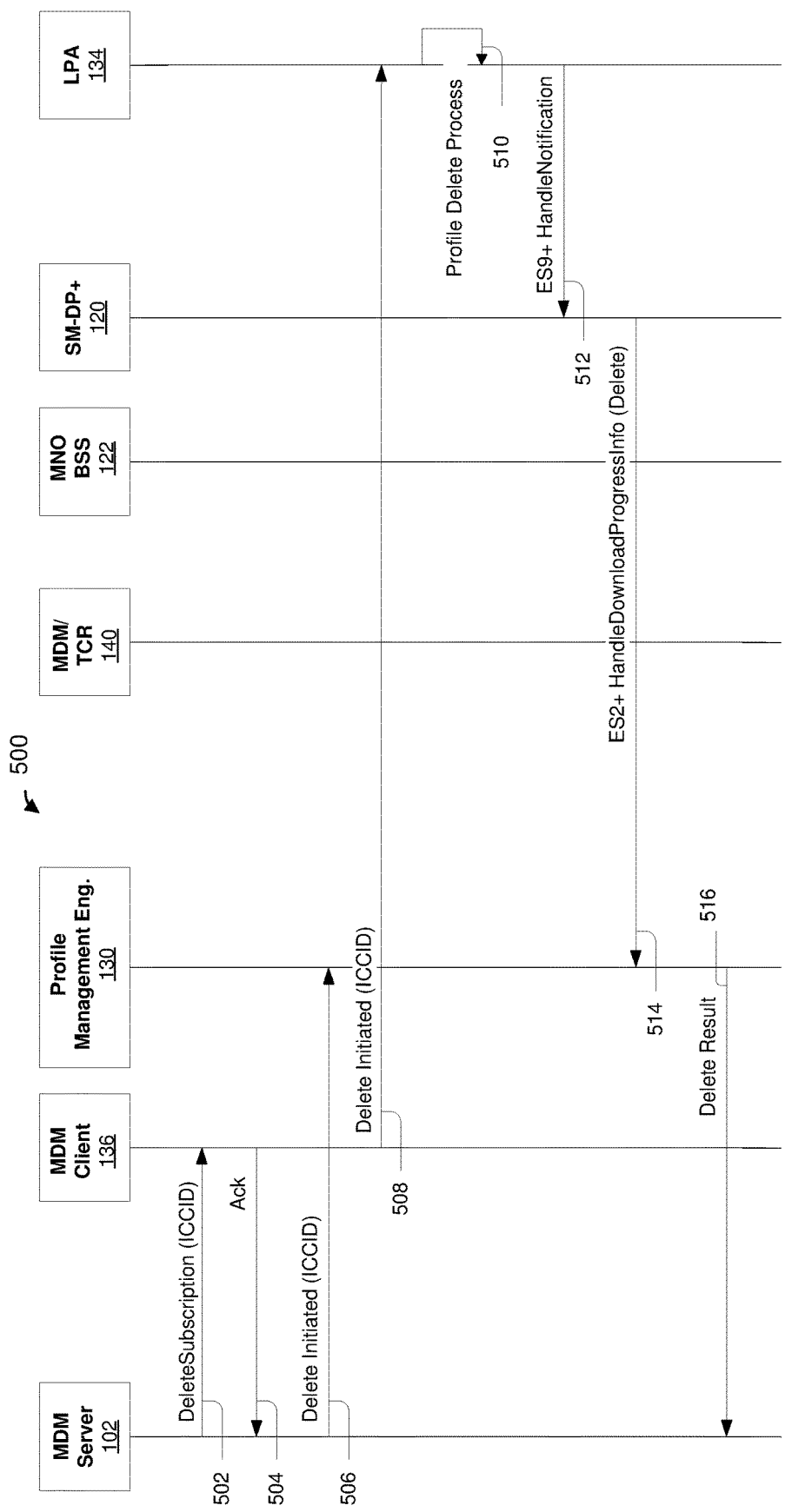
FIG. 5 is a diagram illustrating a subscriber profile deletion process implemented by the profile management engine used with the system of FIG. 1 to cause deletion of a subscriber profile from mobile device, according to an embodiment.

FIG. 5 is a diagram illustrating a subscriber profile deletion process 500 for deleting subscriber profile from mobile device 106, according to an embodiment. For example, MDM server 102 may initiate deletion of a subscriber profile from a mobile device 106 managed by MDM system 112 of MDM server 102. MDM server 102 may initiate deletion of a subscriber profile by transmitting a delete subscription message 502 to MDM client 136 of mobile device 106. Delete subscription message 502 may include a subscriber profile identifier (e.g., ICCID) associated with subscriber profile for which deletion is being initiated. MDM client 136 may respond with an Ack message 504, acknowledging receipt of delete subscription message 502. MDM sever 506 may transmit a delete initiated message 506 to profile management engine 130. Delete initiated message 506 may include a subscriber profile identifier (e.g., ICCID) associated with subscriber profile for which deletion is initiated, to inform profile management 130 that deletion of the corresponding subscriber profile has been initiated.

Referring still to FIG. 5, MDM client 136 may send a delete initiated command, including the subscriber profile identifier (e.g., ICCID) to LPA 134 to trigger deletion of the corresponding subscriber profile. LPA 134 may perform profile delete process 510 to delete the corresponding profile from secure element 132. LPA 134 may also generate and transmit a handle notification message (e.g., ES9+ handle notification message) to SM-DP+ 120 to inform SM-DP+ 120 that the subscriber profile is deleted from mobile device 106. In some embodiments, SM-DP+ 120 may transmit a handle download progress information delete message (e.g., ES2+ handle download progress information message) 514 to profile management engine 130, for example informing profile management engine 130 that deletion of the corresponding subscriber profile has been completed in mobile device 106. In some embodiments, profile management engine 130 may, in turn, generate and transmit a delete result message 516 to MDM server 102, to inform MDM system 112 of MDM server 102 that the subscriber profile has been deleted from mobile device 106.

Figure 6A:
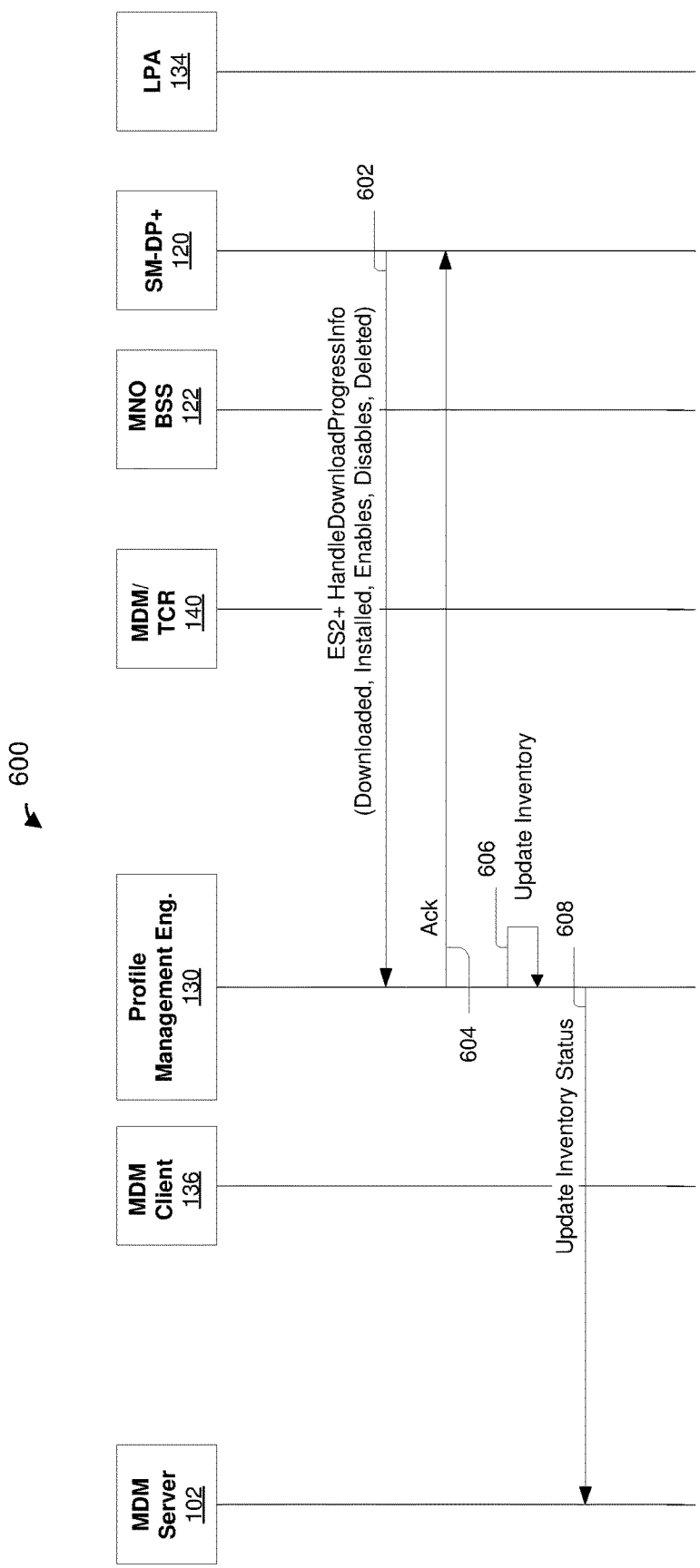
FIGS. 6A-6B are diagrams illustrating subscriber profile inventory reconciliation processes implemented the profile management engine used with the system of FIG. 1, according to embodiments.
Figure 6B:
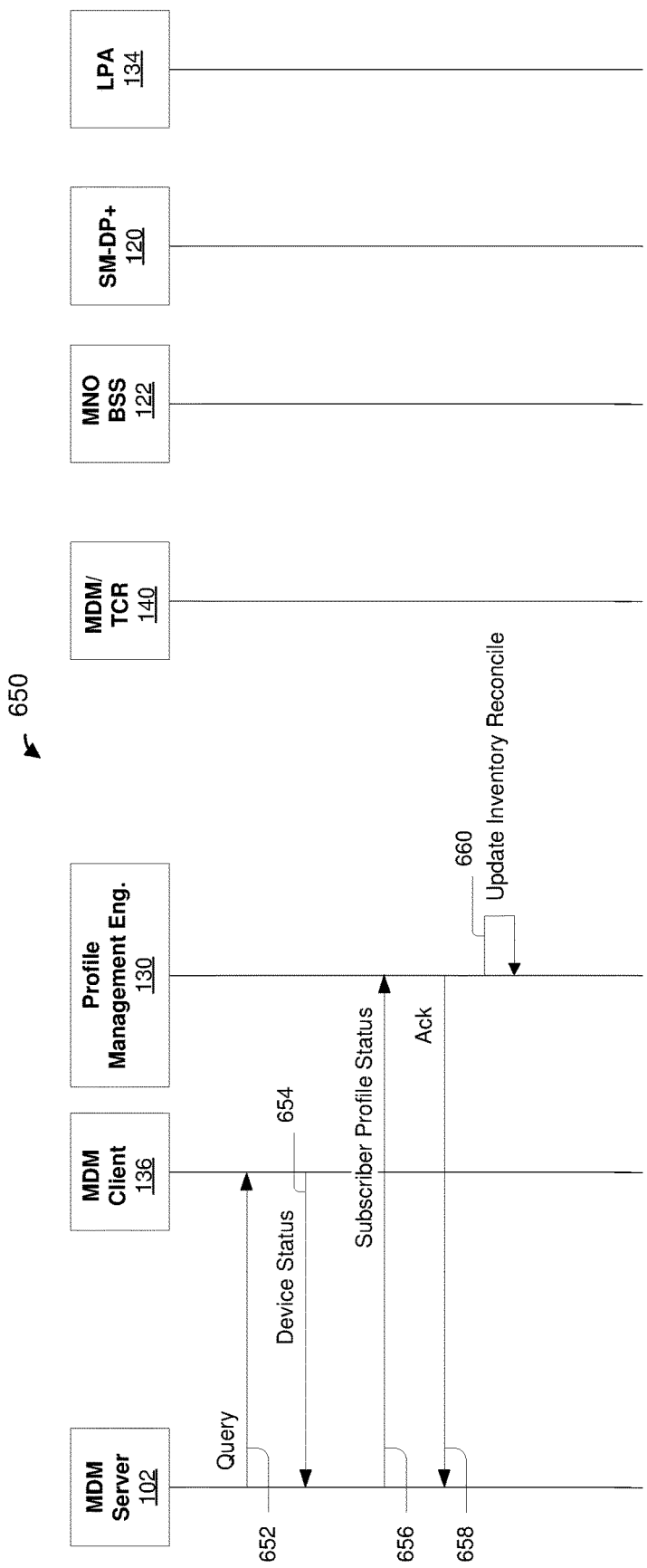

FIGS. 6A-6B are diagrams illustrating subscriber profile inventory maintenance and reconciliation processes 600, 650, according to embodiments. Referring first to FIG. 6A an inventory reconciliation process 600 may be initiated by a notification received from SM-DP+ 120. In an embodiment, profile management engine 130 may receive a handle download progress information message 602 (e.g., ES2+ handle download progress information message) from SM-DP+ 120. Download progress information message 602 may include: (i) a subscriber profile identifier (e.g., ICCID); and (ii) indication indicating that the associated subscriber profile has been one or more of: (a) downloaded, (b) installed, (c) enabled, (d) disabled, and/or (e) deleted from mobile device 106. Profile management engine 130 may generate and transmit an Ack message 604 to SM-DP+ 120, acknowledging receipt of download progress information message 602.

In response to receiving download progress information message 602, profile management engine 130 may perform an inventory update 606 in accordance with indication provided in download progress information message 602. For example, profile management engine 130 may maintain an inventory database to keep track of subscriber profiles available for and/or issued to mobile devices 106 associated with particular businesses or enterprises, and profile management engine 130 may update the inventory database to indicate download, installation, enabling, disabling, deletion, etc. of a subscriber profile in a mobile device 106 associated with a business or enterprise. Profile management engine 130 may generate and transmit an update inventory status message 608 to MDM server 102, to inform MDM system 112 of MDM server 102 that and how inventory has been updated for a particular subscriber profile managed by MDM system 112.

Referring now to FIG. 6B, an inventory maintenance and reconciliation process 650 may be initiated by a device query message 652 transmitted by MDM server 102 to MDM client 136. In response to receiving the query message 652, MDM client 136 may generate and transmit a device status message 654 to MDM server 102, the device status message 654 indicating subscriber profile status, such as: (i) downloaded, (ii) installed, (iii) enabled, (iv) disabled, and/or (v) deleted, for one or more subscriber profiles on mobile device 106. In another embodiment, MDM client 136 may automatically, for example periodically (e.g., every 12 hours), transmit the device status message 654 to MDM server 102, without receiving the device query message 652 transmitted by MDM server 102. In such embodiment, process 650 may omit transmission of the device query message 652 by MDM server 102. MDM server 656 may generate and transmit a subscriber profile status message 656 to profile management engine 130, relaying subscriber profile status to profile management engine 130. Profile management engine 130 may generate and transmit an Ack message 658 to MDM server 102, acknowledging receipt of subscriber profile status message 656.

In response to receiving download subscriber profile status message 656, profile management engine 130 may perform an inventory update 660 in accordance with an indication provided in subscriber profile status message 656. For example, profile management engine 130 may maintain an inventory database to keep track of subscriber profiles available for and/or issued to mobile devices 106 associated with particular businesses or enterprises, and profile management engine 130 may update the inventory database to indicate download, installation, enabling, disabling, deletion, etc. of a subscriber profile in the mobile device 106 associated with a business or enterprise.

Figure 7:
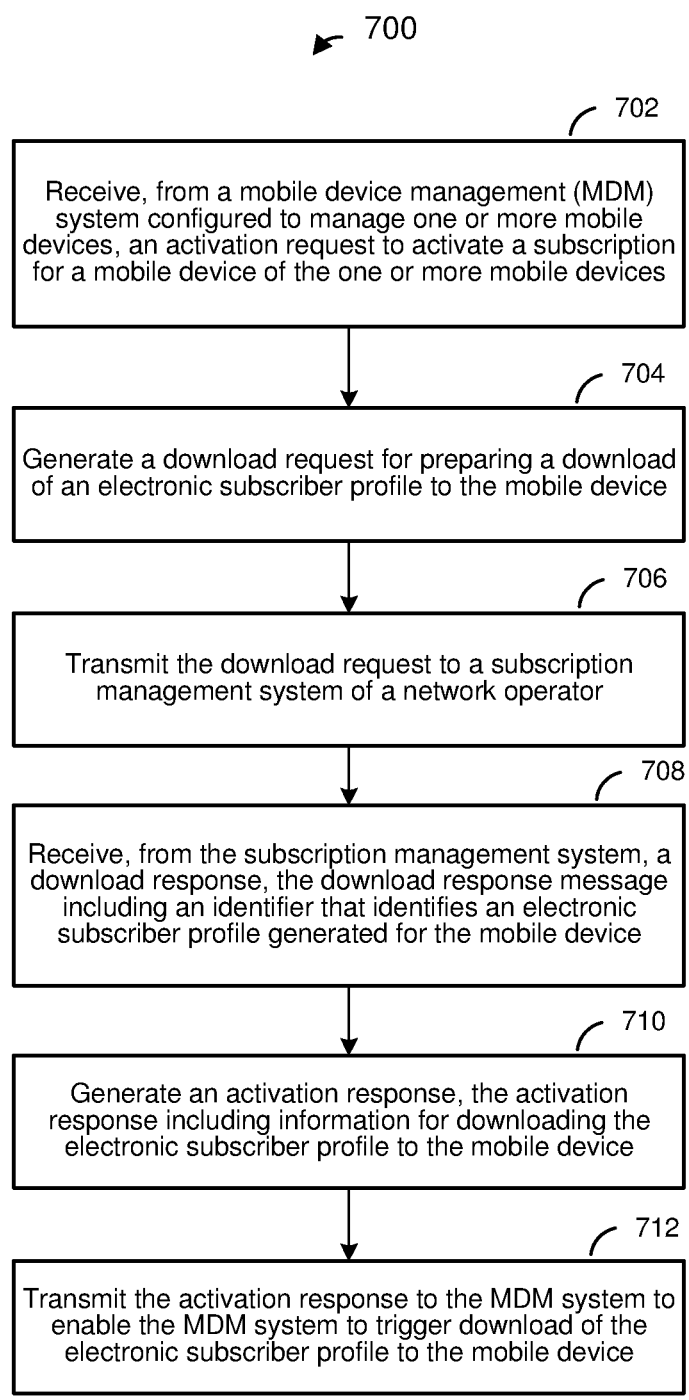
FIG. 7 is a flow chart of a computer-implemented method for activating a network operator subscription, according to an embodiment.

FIG. 7 is a flow chart of a computer-implemented method 700 for activating a network operator subscription, according to an embodiment. In an embodiment, the method 700 is performed by the subscription profile engine 130 of FIG. 1. In another embodiment, the method 700 is performed by a suitable profile management device different from the profile management engine 130 of FIG. 1.

At block 702, an activation request is received. In an embodiment, the activate subscription message 304 of FIG. 3 is received. In another embodiment, another suitable activation request is received. The activation request is received from an enterprise MDM server (e.g., the MDM server 102), and requests activation of a subscriber profile for a mobile device among one or more mobile devices managed by the enterprise MDM server. In an embodiment, the activation request includes information identifying the enterprise MDM server from which the activation request is being sent, information identifying a mobile device, information identifying a user of mobile device, etc.

At block 704, a download request is generated. In an embodiment, download order request message 324 of FIG. 3 is generated. In another embodiment, another suitable download request is generated. In an embodiment, the download request includes an identifier of secure element (e.g., EID) for which subscriber profile is being requested, an indication of a profile type to be generated, etc.

At block 706, the download request is transmitted to a subscription management system (e.g., SM-DP+ 120), and at block 708, a download response is received from the subscription management system. In an embodiment, download order response message 326 of FIG. 3 is received. In another embodiment, another suitable download response is received. In an embodiment, the download response includes an identifier (e.g., ICCID) of a subscriber profile generated by the subscription management system in response to the download request transmitted at block 706.

At block 710, an activation response is generated. In an embodiment, the activate subscription response message 338 of FIG. 3 is generated. In another embodiment, another suitable activation response is generated. The activation response is generated to include information for downloading the subscriber profile generated for the mobile device. For example, activation response is generated to include an activation code for downloading the subscriber profile generated for the mobile device.

At block 712, the activation response generated at block 710 is transmitted to the MDM server to enable the MDM server to trigger download of the generated subscriber profile from the subscription management system to the mobile device.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method for activating a network operator subscription, the method comprising:
   receiving, at a profile management engine from a mobile device management (MDM) server configured to manage one or more mobile devices, an activation request to activate a subscription for a mobile device of the one or more of mobile devices;
   generating, at the profile management engine, a download request for preparing a download of an electronic subscriber profile to the mobile device;
   transmitting, with the profile management engine, the download request to a subscription management system of a network operator;
   receiving, at the profile management engine from the subscription management system, a download response, the download response including an identifier that identifies an electronic subscriber profile generated for the mobile device;
   generating, at the profile management engine, an activation response including information for downloading the electronic subscriber profile generated for the mobile device; and
   transmitting, from the profile management engine to the MDM server, the activation response to the MDM server to enable the MDM server to trigger download of the electronic subscriber profile from the subscription management system to the mobile device.

2. The method of claim 1, further comprising:
prior to generating the download request, performing, at the profile management engine, one or more validations;
generating the download request in response to passing the one or more validations.

3. The method of claim 2, wherein the one or more validations include one or more of: (i) mobile network operator contract validation, (ii) mobile network operator policy validation, ((iii) enterprise rule validation, (iv) enterprise eligibility check, (v) embedded universal integrated circuit card (eUICC) eligibility check, and (vi) mobile device eligibility check.

4. The method of claim 3, wherein performing the device eligibility check comprises:
transmitting a request for device information from the profile management engine to an device database; and
performing the device eligibility check based on device information obtained from the device database.

5. The method of claim 3, wherein the one or more validations include the enterprise rules check includes selecting one or both of (i) a target network operator and (ii) a profile type.

6. The method of claim 5, wherein generating the download request comprises generating the download request to include an indication of the profile type.

7. The method of claim 1, further comprising:
generating, at the profile management engine, an activation code for secure download of the electronic subscriber profile from the subscription management system; and
generating the activation response includes generating the activation response to include the activation code.

8. The method of claim 7, wherein generating the activation code comprises generating the activation code based at least in part on the identifier that identifies the electronic subscriber profile.

9. The method of claim 1, further comprising:
receiving, at the profile management engine, a download notification indicating that the electronic subscriber profile has been installed on the mobile device; and
in response to receiving the download notification, updating subscriber profile inventory, maintained by the profile management engine, to indicate download of the electronic subscriber profile to the mobile device.

10. The method of claim 1, further comprising:
receiving, at the profile management engine, a deletion notification indicating that the electronic subscriber profile has been deleted from the mobile device; and
in response to receiving the deletion notification, updating subscriber profile inventory, maintained by the profile management engine, to indicate deletion of the electronic subscriber profile to the mobile device.

11. A tangible, non-transitory computer readable medium, or media, storing machine-readable instructions that, when executed by one or more processors, cause the one or more processors to:
process an activation request to activate a subscription for a mobile device, the request received from a mobile device management (MDM) server configured to manage one or more mobile devices;
generate a download request for preparing a download of an electronic subscriber profile to the mobile device;
cause the download request to be transmitted to a subscription management system of a network operator;
process a download response received from the subscription management system, the download response including an identifier that identifies an electronic subscriber profile generated for the mobile device;
generate an activation response including information for downloading the electronic subscriber profile generated for the mobile device; and
cause the activation response to be transmitted to the MDM sever to enable the MDM server to trigger download of the electronic subscriber profile from the subscription management system to the mobile device.

12. The tangible, non-transitory computer readable medium, or media of claim 11, storing machine-readable instructions that, when executed by one or more processors, further cause the one or more processors to:
prior to generating the download request, perform one or more validations; and
generate the download request in response to passing the one or more validations.

13. The tangible, non-transitory computer readable medium, or media of claim 12, wherein the one or more validations include one or more of" (i) mobile network operator contract validation, (ii) mobile network operator policy validation, (iii) enterprise rule validation, (iv) enterprise eligibility check, (v) embedded universal integrated circuit card (eUICC) eligibility check, and (vi) mobile device eligibility check.

14. The tangible, non-transitory computer readable medium, or media of claim 13, wherein performing the device eligibility check comprises:
transmitting a request for device information from the profile management engine to a device database; and
performing the device eligibility check based on device information obtained from the device database.

15. The tangible, non-transitory computer readable medium, or media of claim 13, wherein the one or more validations include the enterprise rules check includes selecting one or both of i) a target network operator and ii) a profile type.

16. The tangible, non-transitory computer readable medium, or media of claim 15, wherein generating the download request comprises generating the download request to include an indication of the profile type.

17. The tangible, non-transitory computer readable medium, or media of claim 15, storing machine readable instructions that, when executed by one or more processors, further cause the one or more processors to:
generate an activation code for secure download of the electronic subscriber profile from the subscription management system; and
generate the activation response to include the activation code.

18. The tangible, non-transitory computer readable medium, or media of claim 15, wherein generating the activation code comprises generating the activation code based at least in part on the identifier that identifies the electronic subscriber profile.

19. The tangible, non-transitory computer readable medium, or media of claim 11, storing machine readable instructions that, when executed by one or more processors, further cause the one or more processors to:
receive a download notification indicating that the electronic subscriber profile has been installed on the mobile device; and in response to receiving the download notification, update subscriber profile inventory, maintained by the profile management engine, to indicate download of the electronic subscriber profile to the mobile device.

20. The tangible, non-transitory computer readable medium, or media of claim 11, storing machine readable instructions that, when executed by one or more processors, further cause the one or more processors to:

receive, at the profile management engine, a deletion notification indicating that the electronic subscriber profile has been deleted from the mobile device; and in response to receiving the deletion notification, update subscriber profile inventory to indicate deletion of the electronic subscriber profile to the mobile device.

* * * * *